(12) United States Patent
Hansen et al.

(10) Patent No.: US 7,204,087 B2
(45) Date of Patent: Apr. 17, 2007

(54) HYDRAULIC TOOL

(75) Inventors: Leif Hansen, Soenderborg (DK); Christen Espersen, Augustenborg (DK); Thyge Bollmann, Augustenborg (DK); Peter J. M. Clausen, Nordborg (DK)

(73) Assignee: miniBooster Hydraulics A/S, Sonderborg (DK)

( * ) Notice: Subject to any disclaimer, the term of this patent is extended or adjusted under 35 U.S.C. 154(b) by 122 days.

(21) Appl. No.: 11/057,406

(22) Filed: Feb. 11, 2005

(65) Prior Publication Data
US 2005/0178121 A1 Aug. 18, 2005

(30) Foreign Application Priority Data
Feb. 16, 2004 (DE) .................. 10 2004 007 684

(51) Int. Cl.
*B60T 13/00* (2006.01)
(52) U.S. Cl. .............................. 60/560; 60/562
(58) Field of Classification Search .............. 60/560, 60/562, 563, 571, 593
See application file for complete search history.

(56) References Cited
U.S. PATENT DOCUMENTS

| | | | |
|---|---|---|---|
| 3,382,669 A * | 5/1968 | Bauer | 60/563 |
| 3,837,076 A * | 9/1974 | Good, Jr. | 60/547.1 |
| 3,889,340 A | 6/1975 | Dixon, Jr. | |
| 4,366,673 A * | 1/1983 | Lapp | 60/477 |
| 4,506,445 A | 3/1985 | Esten | |
| 4,924,671 A * | 5/1990 | Reinert | 60/428 |
| 5,105,543 A | 4/1992 | Maarschalk et al. | |

FOREIGN PATENT DOCUMENTS

| | | |
|---|---|---|
| DE | 77 11 083 | 4/1977 |
| DE | 4 413 560 | 10/1995 |
| DE | 196 33 258 | 8/1997 |
| DE | 44 13 560 | 2/1998 |
| EP | 0 156 939 | 10/1985 |
| EP | 0 631 533 | 12/1997 |
| EP | 1 498 204 | 1/2005 |

\* cited by examiner

*Primary Examiner*—Igor Kershteyn
(74) *Attorney, Agent, or Firm*—Friedrich Kueffner

(57) ABSTRACT

A hydraulic tool has a motor, a valve, a hydraulic intensifier, and a supply connector. The hydraulic intensifier is arranged between the valve and the motor. The valve and the motor are arranged behind one another in a longitudinal direction of the tool. The hydraulic intensifier has at least one intensifier piston having a movement direction that is positioned at a first angle greater than 0° relative to the longitudinal direction of the tool.

12 Claims, 2 Drawing Sheets

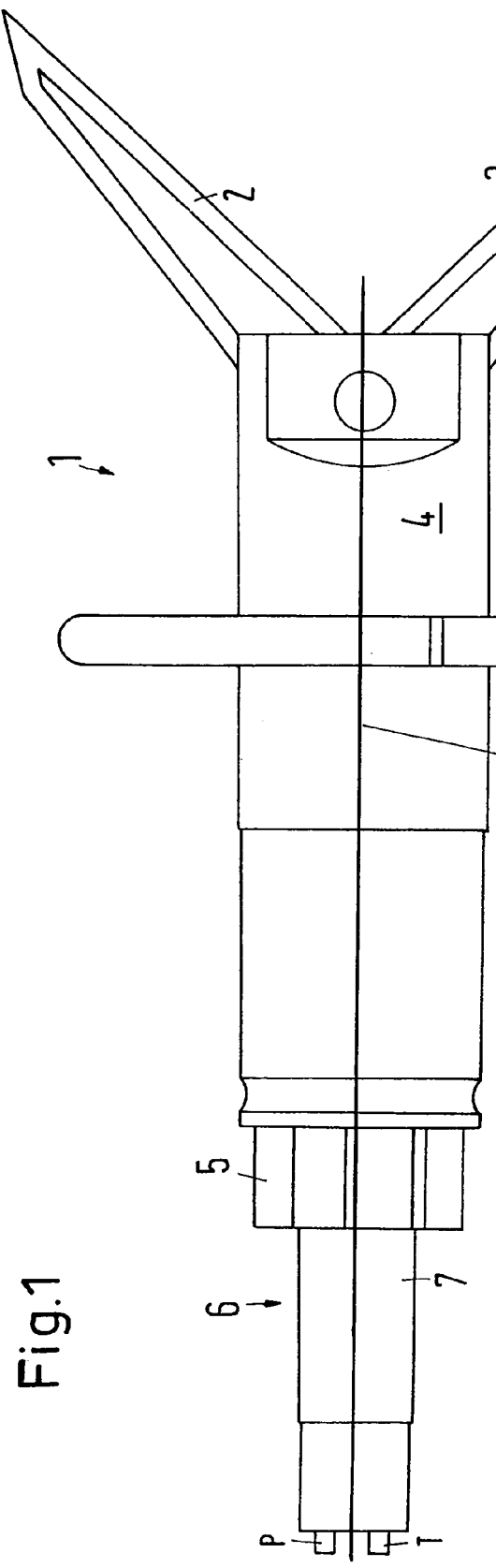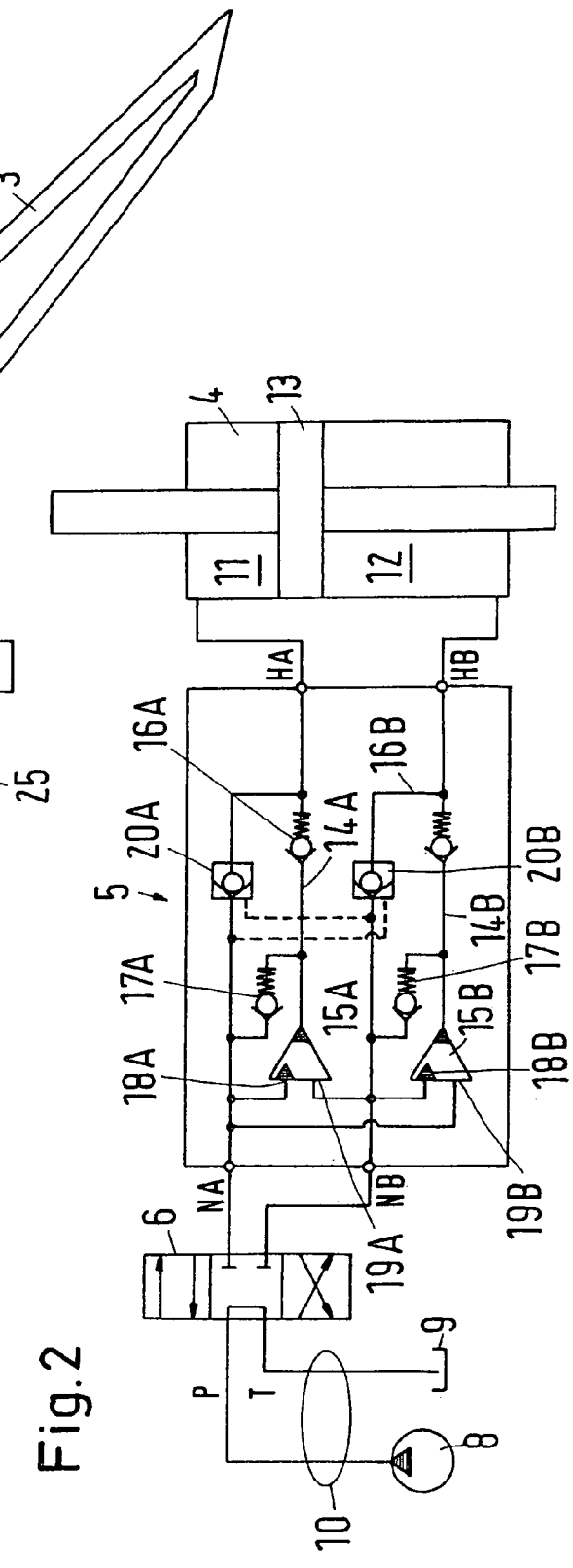

HYDRAULIC TOOL

BACKGROUND OF THE INVENTION

1. Field of the Invention

The invention relates to a hydraulic tool comprising a motor, a valve, a hydraulic intensifier, and a supply connector.

2. Description of the Related Art

The invention concerns in particular a transportable hydraulic rescue tool. Such a rescue tool can be configured as a hydraulic cutting device, a hydraulic spreader, a combination device, a cutter for pedals, a lifting device or a similar device. For example, a cutting device that is configured as hydraulic shears is required in order to be able to free in an automobile accident passengers of a greatly deformed motor vehicle.

Conventionally, such tools are supplied by a pressure source that is transported on a vehicle. Such a pressure source has a limited output pressure. In order to be able to provide the desired performance despite of this, the tools must be relatively large and heavy; this complicates their handling.

It has therefore already been suggested to provide such a tool with a hydraulic intensifier. In this case, the conduits that extend from the pressure source to the tool must have only a limited pressure resistance. The higher operating pressure is generated by the hydraulic intensifier directly within the tool.

However, this configuration requires also a certain size and stability because the valve must control the higher pressure.

SUMMARY OF THE INVENTION

It is an object of the present invention to design a transportable hydraulic tool such that it can be handled easily.

In accordance with the present invention, this is achieved in that the hydraulic intensifier is arranged between the valve and the motor.

Such a configuration provides the advantage that the motor of the tool can be operated at a relatively high hydraulic pressure. This pressure is provided by the hydraulic intensifier. However, it is not necessary to accept the disadvantage of having to configure the valve for a higher hydraulic pressure. The valve must only be able to withstand the pressure that is provided by the pressure source and is transmitted by the supply connector to the tool. Even though the valve must enable a higher throughput of hydraulic liquid, this is possible without problems in most cases. As mentioned before, the valve must be able to withstand only minimal pressures so that it can be of a small size and has only a minimal weight. Moreover, the valve becomes significantly more cost efficient. Since the valve can be smaller, the tool as a whole is lighter and thus also easier to handle. For the configuration of the motor of the tool there are different possibilities. For example, it is possible to design the motor as a single-action or double-action piston-cylinder arrangement. It is also possible to configure the motor as a rotary motor, for example, as a gear motor or gerotor motor. It is not necessary to provide hose conduits with fittings for higher pressures. All of the aforementioned units valve, hydraulic intensifier, motor, and tool are combined to a compact unit.

Preferably, the valve and the motor are arranged behind one another in the longitudinal direction and the hydraulic intensifier has at least one intensifier piston whose movement direction is positioned at an angle greater than 0° relative to the longitudinal direction. In this case, a significantly shortened length of the hydraulic intensifier in the longitudinal direction results. The user can therefore keep the tool significantly closer to the actual working area. This provides for a more comfortable working position so that working with minimal fatigue is possible.

Preferably, the angle is within the range of 70° to 110°. The movement direction of the piston therefore is positioned at an angle of approximately 90° relative to the longitudinal direction. Accordingly, the lifting stroke of the intensifier piston of the hydraulic intensifier practically plays no role in regard to the length of the hydraulic intensifier. Only the diameter of the intensifier piston has a certain effect on the size of the hydraulic intensifier in the longitudinal direction. It is therefore possible to size the hydraulic intensifier exclusively with respect to the pressure to be achieved without having to particularly consider other constructive conditions.

Preferably, the hydraulic intensifier has at least one control valve with a valve slide whose movement direction is positioned at a predetermined angle relative to the longitudinal direction. In this connection, it is thus also provided that the valve slide of the control valve is not moved in the longitudinal direction so that the movement stroke of the valve slide and its axial length has practically no effect in the axial direction with respect to the size of the hydraulic intensifier.

Preferably, the angle of the intensifier piston and the angle of the valve slide are identical. The piston and the valve slide are therefore arranged parallel to one another and move parallel to one another. This facilitates the manufacture. Bores for the piston and the valve slide are required in only one direction.

Preferably, the intensifier piston and the valve slide are arranged adjacent to one another in a direction that is perpendicular to the longitudinal direction and perpendicular to the movement direction. The term perpendicular is not to be understood in its precise mathematical sense. Deviations from a right angle are therefore absolutely permissible as long as the size of the hydraulic intensifier in the longitudinal direction is not significantly increased. Accordingly, the valve slide, and the intensifier piston are arranged adjacent to one another, i.e., the width of the hydraulic intensifier is utilized in order to house these two elements. In this way, the length of the hydraulic intensifier in the longitudinal direction is not enlarged. The movement direction of piston and valve slide extends again perpendicularly to the longitudinal direction and perpendicularly to the transverse direction so that in this way also the length of the hydraulic intensifier is not increased.

Preferably, an intake valve and an outlet valve are arranged in the longitudinal direction on opposed sides of the intensifier piston. The intake valve and the outlet valve require a certain size but this size is however present anyway because in the surroundings of the intensifier piston a certain wall thickness must be provided in order to be able to withstand the high pressures that are generated.

Preferably, the hydraulic intensifier has a housing that is divided perpendicularly to the movement direction of the intensifier piston into at least two housing parts wherein the housing parts are connected to one another by clamping elements and wherein the intensifier piston is positioned closer to one clamping element than its correlated valve slide. In this way, forces that are the result of the generated high pressures as the intensifier piston is moved are diverted directly into the clamping elements. The clamping elements can be, for example, a threaded bolt. In this way, it is ensured that the seal-tightness of the housing is ensured also along the dividing line.

Preferably, one housing part has a through bore that forms a cylinder in which a low-pressure part of the intensifier piston moves. This configuration facilitates the manufacture.

Preferably, the hydraulic intensifier has an intensifier path with its own intensifier piston for each working direction of the motor. This has the advantage that a directional reversal by a valve is no longer required in the high pressure area but instead the directional reversal can be limited exclusively to the low-pressure area.

Preferably, the two amplifier pistons are arranged adjacent to one another perpendicularly to the longitudinal direction. In this way, the two intensifier pistons do not occupy more space in the longitudinal direction than a single intensifier piston.

Preferably, parallel to each intensifier path a stop valve is provided that can be controlled by a pressure within the other intensifier path, respectively. This facilitates the flow control of hydraulic liquid in one or the other working direction when generating the high pressure.

BRIEF DESCRIPTION OF THE DRAWING

In the drawing:

FIG. 1 is a schematic illustration of a portable hydraulic rescue tool;

FIG. 2 is a schematic illustration of a hydraulic circuit diagram;

DESCRIPTION OF THE PREFERRED EMBODIMENTS

Figure 5:
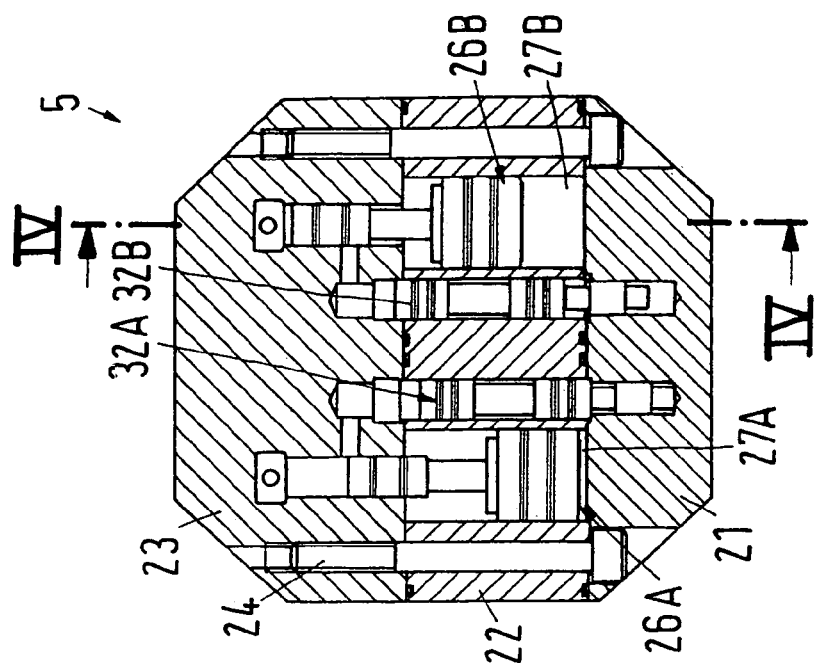
FIG. 5 is a section view along section line V—V of FIG. 4.

A portable hydraulic rescue tool 1 in the embodiment illustrated in FIG. 1 is in the form of shears. The shears have two jaws 2, 3 that are movable toward one another and are operated by a motor 4. As can be seen in FIG. 2, the motor 4 is a double-acting piston-cylinder device.

At the end of the motor 4 facing away from the jaws 2, 3, a hydraulic intensifier 5 is arranged that is attached to the motor 4 in a way not disclosed in detail. At the end of the hydraulic intensifier 5 facing away from the motor 4, a valve 6 is arranged that controls by means of a rotary grip 7 the direction of movement of the jaws 2, 3. The valve 6 in turn has a supply connector arrangement with a pump connector P and a tank connector T. The pump connector P, as shown in FIG. 2, is connected to a pump 8. The tank connector T is connected to a tank 9. Pump 8 and tank 9 can be arranged on a self-propelled device carrier, for example, a fire department vehicle. From there, the connection to the valve 6 is provided by means of a schematically illustrated conduit 10 whose length can be several tens of meters.

The pump provides a relatively low initial pressure of, for example, 20 bar. With this initial pressure theoretically the actuation of the tool 1 is conceivable. In order to generate a sufficient force, the tool 1 however would have to be sized relatively large. This would make handling more difficult.

The high pressure required within the tool 1 is made available by the hydraulic intensifier 5. The hydraulic liquid is controlled however on the low-pressure side by the valve 6. The hydraulic intensifier 5 is arranged between the valve 6 and the motor 4.

The hydraulic intensifier 5 has a first low-pressure connector NA and a second low-pressure connector NB. Moreover, the hydraulic intensifier 5 has a first high-pressure outlet HA and a second high-pressure outlet HB. The two high-pressure outlets HA, HB are connected to the motor 4 and supply hydraulic liquid to the motor 4 at a pressure of, for example, several hundred bar.

In order to achieve this pressure intensification, the hydraulic intensifier 5 has its own intensifier path 14A, 14B for each movement direction of the motor 4, i.e., for each working chamber 11, 12 on opposed sides of a piston 13. In each intensifier path 14A, 14B an intensifier 15A, 15B is provided. Each intensifier 15A, 15B is connected in series to a check valve 16A, 16B. The outlet of the intensifier 15A that is connected to the check valve 16A is connected by a second check valve 17A to the low-pressure connector NA. An intensifier inlet 18A of the intensifier 15 A is also connected to the first low-pressure connector NA. A low-pressure connector 19A of the first intensifier 15A is connected to the second low-pressure connector NB.

In the same way, the outlet of the intensifier 15B is connected by a check valve 17B to the second low-pressure connector NB. An intensifier inlet 18B of the intensifier 15B is connected to the second low-pressure connector NB. The low-pressure connector 19B of the intensifier 15B is connected to the first low-pressure connector NA.

Parallel to the intensifier paths 14A, 14B, there is a stop valve 20A, 20B that is connected to the low-pressure connector NA, NB, respectively, that in turn is connected to the intensifier inlet 18A, 18B of the intensifier 15 A, 15B, respectively, but can be controlled by means of the other low-pressure connector NB, NA, respectively.

By means of the valve 6 it is now controlled whether one of the low-pressure connectors NA, NB, and if so which one, is supplied with pressure by the pump 8 through the pump connector P. When, for example, the valve 6 is actuated to assume the above illustrated position, hydraulic liquid flows at low pressure through the low-pressure connector NA into the intensifier 15A, is intensified therein, and is then discharged through the check valve 16A to the high-pressure connector HA. The intensifier 15A takes in through the check valve 17A liquid from the low-pressure connector NA. At the same time, the stop valve 20B that is parallel to the other intensifier path 14B is actuated so that the working chamber 11 is enlarged by the supplied hydraulic liquid and the working chamber 12 becomes smaller as the liquid is discharged through the stop valve 20B. The piston 13 moves in this case from the top to the bottom (relative to the illustration of FIG. 2). When the valve 6 has been moved into the position that is illustrated at the bottom, the other supply path 14B is pressurized and the piston 13 is moved from the bottom to the top.

Figure 4:
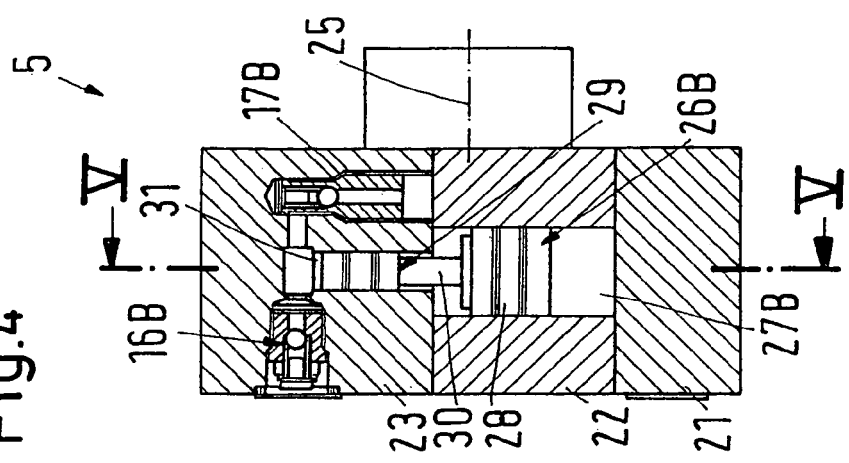
FIG. 4 is a section view of a hydraulic intensifier taken along section line IV—IV of FIG. 5.
Figure 3:
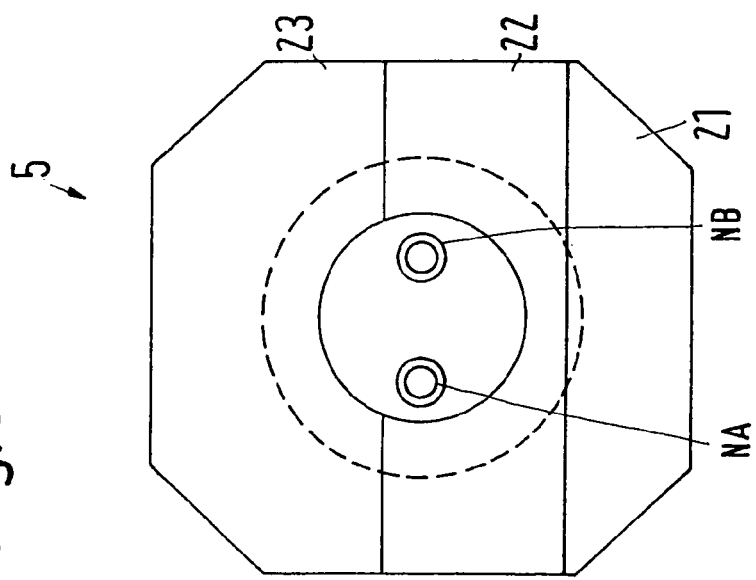
FIG. 3 is a plan view onto a hydraulic intensifier.

FIGS. 3 to 5 show an end view (FIG. 3) and sections views of the hydraulic intensifier 5. The hydraulic intensifier 5 has a housing that is comprised of three parts in the present illustration: the bottom part 21, the central part 22, and the top part 23. The three parts are held together by screws 24. As illustrated in FIG. 3, the two low-pressure connectors NA, NB are arranged at one end face (the right side in FIG. 4).

The tool 1, as can be seen in FIG. 1, has a predominant longitudinal direction 25 that is illustrated by a line. Each intensifier 15A, 15B has an intensifier piston 26A, 26B whose movement direction is perpendicular to the longitudinal direction 25. In this way, it is possible to keep the hydraulic intensifier 5 relatively short in the longitudinal direction 25. Compared to a configuration in which the intensifier pistons 26A, 26B extend parallel to this longitudinal direction 25, the extension can be reduced to less than half said length.

The intensifier piston 26A, 26B are arranged in cylinders 27A, 27B that are formed as through bores within the central part 22. This simplifies the manufacture. The bores 27A, 27B form low-pressure cylinders that are connectable by valves, to be explained infra, to the low-pressure connectors NA, NB.

Each intensifier piston 26A, 26B has a low-pressure piston 28 and a high-pressure piston 29 that are connected to one another by a connection 30. The two intensifier pistons 26A, 26B are identical so that only one intensifier piston 26B will be explained in the following.

The high-pressure cylinder 31 communicates through the check valve 16B with the second high-pressure connector HB and through the check valve 17B with the low-pressure connector NB. The check valve 17B forms an intake valve and the check valve 16B an outlet valve. Intake valve and outlet valve are arranged in the longitudinal direction 25 on opposed sides of the high-pressure piston 29. In this area, the top part 23 of the housing has a relatively great wall thickness so that the two valves 16B, 17B can be arranged therein without having to enlarge the required mounting space.

The valves required for controlling the intensifier pistons 26A, 26B have valve slides 32A, 32B that are movable parallel to the intensifier pistons 26A, 26B. Relative to their movement direction and relative to the longitudinal direction 25, they are arranged adjacent to one another, i.e., they are arranged perpendicularly and behind one another relative to the plane of illustration of FIG. 4.

In this way, it is ensured that the housing 21–23 of the hydraulic intensifier 5 can be practically configured as a relatively flat disk. This disk has an extension in the longitudinal direction 25 of approximately 50 mm; it does not contribute significantly to an extension of the length of the tool 1.

As can be seen in particular in FIG. 5, the intensifier pistons 26A, 26B are closer to the bolts 24 than the corresponding valve slides 32A, 32B. This contributes to a better absorption of the high pressures that are generated in the high-pressure cylinders 31.

The function of a single intensifier piston is known in general in the prior art. For example, the valve slides 32A, 32B, can be constructed and the intensifier 1SA, 15B can be operated as disclosed in DE 196 33 258 C1.

It can be seen that the control slides 32A, 32B have a smaller diameter than the low-pressure pistons 28 of the intensifier pistons 26A, 26B. Accordingly, when it is indicated that the intensifier pistons 26A, 26B and the valve slides 32A, 32B are arranged adjacent to one another, this does not mean that their central axes must be arranged within a single plane. Displacements are obviously permissible as long as it is ensured that with such displacements the axial length of the hydraulic intensifier 5 is not significantly enlarged. In particular, the goal should be in this connection that the valve slides 32A, 32B are arranged within the open space that is delimited by tangential planes at the low-pressure pistons 28 of the intensifier pistons 26A, 26B.

While specific embodiments of the invention have been shown and described in detail to illustrate the inventive principles, it will be understood that the invention may be embodied otherwise without departing from such principles.

What is claimed is:

1. A hydraulic tool comprising a motor, a valve, a hydraulic intensifier, and a supply connector, wherein the hydraulic intensifier is arranged between the valve and the motor, wherein the valve and the motor are arranged behind one another in a longitudinal direction of the tool, wherein the hydraulic intensifier comprises at least one intensifier piston.

2. The tool according to claim 1, wherein the intensifier piston has at least one movement direction that is positioned at a first angle greater than 0° relative to the longitudinal direction of the tool.

3. The tool according to claim 2, wherein the first angle is within a range of 70° to 110°.

4. The tool according to claim 2, wherein the hydraulic intensifier has at least one control valve with a valve slide, wherein a movement direction of the valve slide is positioned at a predetermined second angle relative to the longitudinal direction of the tool.

5. The tool according to claim 4, wherein the first angle and the second angle are identical.

6. The tool according to claim 4, wherein the at least one intensifier piston and the valve slide are arranged adjacent to one another in a direction that extends perpendicularly to the longitudinal direction of the tool and perpendicularly to the movement directions of the at least one intensifier piston and of the valve slide.

7. The tool according to claim 2, further comprising an inlet valve and an outlet valve arranged in the longitudinal direction of the tool on opposed sides of the at least one intensifier piston.

8. The tool according to claim 2, wherein the hydraulic intensifier has a housing divided perpendicularly to the movement direction of the at least one intensifier piston into at least two housing parts, wherein the at least two housing parts are connected to one another by clamping elements, wherein the at least one intensifier piston is positioned closer to one of the clamping elements than to the valve slide correlated with the at least one intensifier piston.

9. The tool according to claim 8, wherein one of the at least two housing parts has a through bore that forms a cylinder in which a low-pressure part of the at least one intensifier piston is movably arranged.

10. The tool according to claim 1, wherein the hydraulic intensifier has an intensifier path for each working direction of the motor, wherein each one of the intensifier paths has one of the at least one intensifier piston.

11. The tool according to claim 10, wherein two of the intensifier paths are provided and wherein the intensifier pistons are arranged perpendicularly to the longitudinal direction of the tool adjacent to one another.

12. The tool according to claim 10, wherein parallel to each one of the intensifier paths a stop valve is arranged, wherein the stop valves each are actuated by a pressure in the other intensifier path, respectively.

* * * * *